(12) United States Patent
Kolavennu

(10) Patent No.: US 9,927,819 B2
(45) Date of Patent: Mar. 27, 2018

(54) HOME ENERGY MANAGEMENT DEVICES, SYSTEMS, AND METHODS

(75) Inventor: Soumitri N. Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 764 days.

(21) Appl. No.: 13/431,615

(22) Filed: Mar. 27, 2012

(65) Prior Publication Data
US 2013/0261803 A1  Oct. 3, 2013

(51) Int. Cl.
*G05D 23/19* (2006.01)

(52) U.S. Cl.
CPC ................ *G05D 23/1917* (2013.01)

(58) Field of Classification Search
CPC ........... G05D 23/1917; G05D 23/1902; G05D 23/1904; G05D 23/1923; F24F 11/006; F24F 11/0086; F24F 11/0069; F24F 11/0071; F24F 11/0075
USPC ....... 700/19, 22, 286, 275, 276, 278; 710/11
See application file for complete search history.

(56) References Cited

U.S. PATENT DOCUMENTS

| | | | | |
|---|---|---|---|---|
| 9,605,858 B2 * | 3/2017 | Warren | .................. | F24F 11/0009 |
| 2002/0022991 A1 * | 2/2002 | Sharood | .............. | G06Q 30/0235 |
| | | | | 702/184 |
| 2005/0194456 A1 * | 9/2005 | Tessier | .................... | F24F 11/006 |
| | | | | 236/51 |
| 2008/0183307 A1 * | 7/2008 | Clayton | ................ | G05B 19/042 |
| | | | | 700/8 |
| 2009/0065596 A1 * | 3/2009 | Seem | .................... | F24F 11/0009 |
| | | | | 236/51 |
| 2010/0211546 A1 * | 8/2010 | Grohman et al. | ............. | 707/640 |
| 2010/0238003 A1 * | 9/2010 | Chan | ........................ | G01D 4/004 |
| | | | | 340/538 |
| 2011/0015797 A1 | 1/2011 | Gilstrap | | |
| 2011/0047418 A1 * | 2/2011 | Drees | ...................... | G05B 15/02 |
| | | | | 714/57 |
| 2011/0061014 A1 | 3/2011 | Frader-Thompson et al. | | |
| 2011/0063126 A1 | 3/2011 | Kennedy et al. | | |
| 2011/0202910 A1 | 8/2011 | Venkatakrishnan et al. | | |
| 2011/0264290 A1 | 10/2011 | Drew | | |
| 2012/0061480 A1 * | 3/2012 | Deligiannis | ........... | F24F 11/0012 |
| | | | | 236/51 |
| 2012/0064923 A1 * | 3/2012 | Imes et al. | ..................... | 455/457 |
| 2013/0030590 A1 * | 1/2013 | Prosser | ...................... | H02J 3/14 |
| | | | | 700/295 |

(Continued)

FOREIGN PATENT DOCUMENTS

WO    2009097400    8/2009

OTHER PUBLICATIONS

A Search Report from related European Application No. 13158852. 7-1802, dated Jul. 23, 2013, 5 pgs.

(Continued)

*Primary Examiner* — Nathan L Laughlin
(74) *Attorney, Agent, or Firm* — Brooks, Cameron & Huebsch, PLLC

(57) ABSTRACT

Home energy management devices, systems, and methods are described herein. One device includes a thermostat, wherein the thermostat is configured to control operation of an air conditioner and a furnace of a home, and the thermostat includes a multi-node communication hub configured to control operation of a number of additional energy loads associated with the home.

7 Claims, 2 Drawing Sheets

(56) References Cited

U.S. PATENT DOCUMENTS

2013/0062944 A1* 3/2013 Prosser .................... H02J 4/00
307/29
2014/0058806 A1* 2/2014 Guenette et al. ............ 705/14.1

OTHER PUBLICATIONS

Prolophix: "Prolophix Internet managed Thermostat installation guide", Dec. 31, 2011, 24 pgs, XP 055067438, http://www.proliphix.com/Collateral/Documents/English-US/IMT550_Installation_Guide.pdf.

Schlage Lock Company: "Remote energy management thermostat system installation instructions", Dec. 31, 2011, 13 pgs., http://www.nexiahome.com/projectdocrepository/tsk400bbx_is-a_eng.pdf.

Exam Report and Annex from related EP patent application No. 13158852.7-1802, dated May 22, 2015, 6 pp.

Summons to Attend Oral Proceedings from related European Patent Application No. 13158852, dated Nov. 4, 2016, 8 pp.

* cited by examiner

HOME ENERGY MANAGEMENT DEVICES, SYSTEMS, AND METHODS

TECHNICAL FIELD

The present disclosure relates to home energy management devices, systems, and methods.

BACKGROUND

Home energy management devices, systems, and methods (e.g., home thermostats) can be used to manage and/or control the energy consumption of a home. For example, a home thermostat can control the operation of the furnace and/or air conditioner of the home, which are generally the two major energy loads of the home.

Previous home thermostats, however, may not be able to control the operation of additional energy loads (e.g., additional energy consuming devices, systems, and/or mechanisms) associated with the home other than the furnace and air conditioner. That is, previous home thermostats may only be able to control the operation of the furnace and air conditioner of a home. Accordingly, previous home thermostats may only be able to manage and/or control a small portion of the energy consumption of a home.

DETAILED DESCRIPTION

Figure 1:
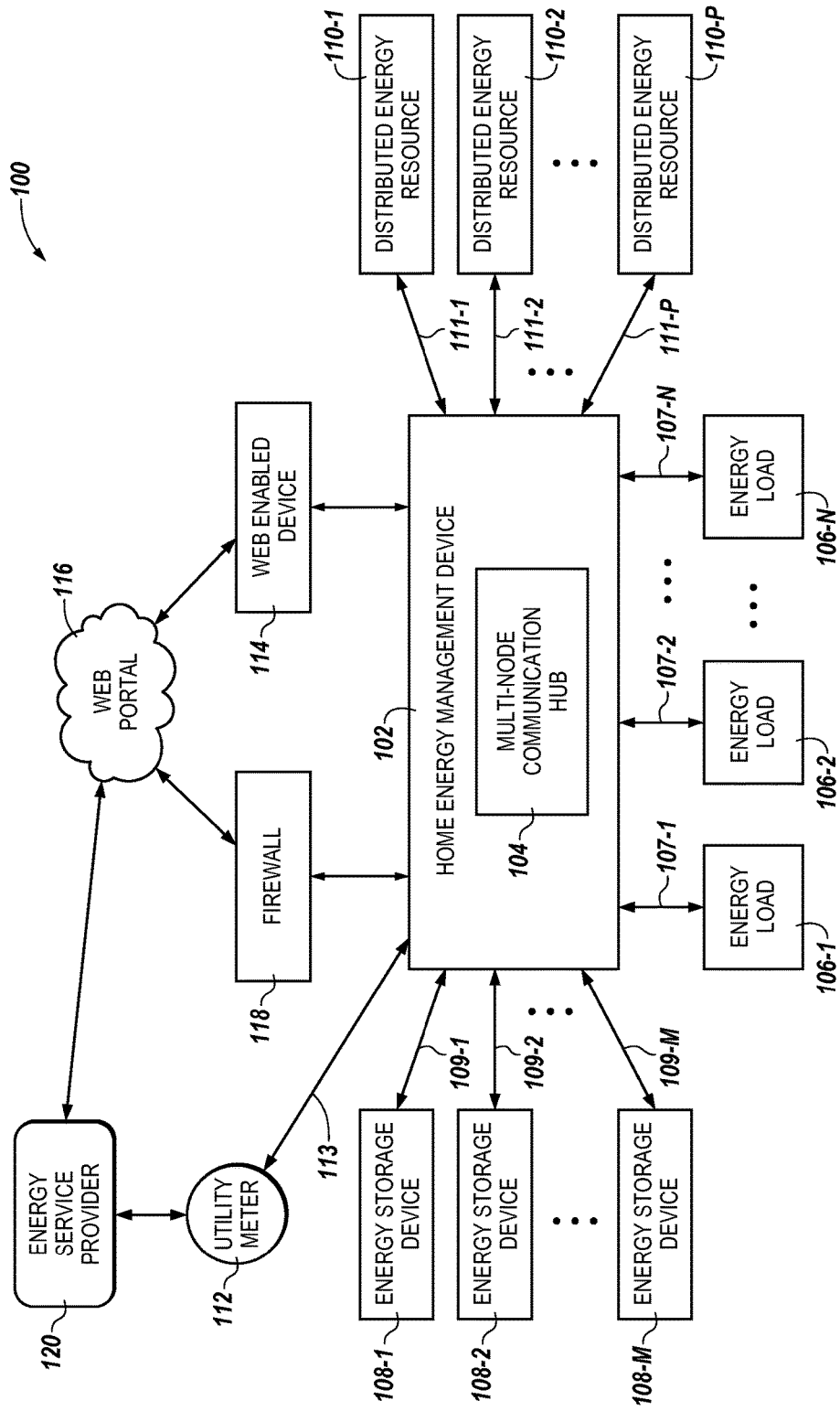
FIG. 1 illustrates a home energy management system in accordance with one or more embodiments of the present disclosure.

Home energy devices, systems, and methods are described herein. For example, one or more embodiments include a thermostat, wherein the thermostat is configured to control operation of an air conditioner and a furnace of a home, and the thermostat includes a multi-node communication hub configured to control operation of a number of additional energy loads associated with the home.

Home energy devices, systems and methods (e.g., home thermostats) in accordance with one or more embodiments of the present disclosure may be able to control the operation of energy loads (e.g., energy consuming devices, systems, and/or mechanisms) associated with a home in addition to (e.g., besides) the furnace and air conditioner of the home. Accordingly, home energy devices, system, and methods in accordance with one or more embodiments of the present disclosure may be able to manage and/or control a greater portion of the energy consumption of a home than previous approaches.

As an example, home energy device, systems, and methods in accordance with one or more embodiments of the present disclosure can adjust the operation of the additional energy loads associated with a home based on a change in price of energy supplied to a home (e.g., by an energy service provider). The price of energy supplied to the home may change based on, for example, time of day, day of week, and/or expected energy demand levels, among other criteria.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a" or "a number of" something can refer to one or more such things. For example, "a number of energy loads" can refer to one or more energy loads. Additionally, the designators "L", "M", "N", and "P" as used herein, particularly with respect to reference numerals in the drawings, indicate that a number of the particular feature so designated can be included with a number of embodiments of the present disclosure.

FIG. 1 illustrates a home energy management (HEM) system 100 in accordance with one or more embodiments of the present disclosure. As shown in FIG. 1, HEM system 100 includes a home energy management (HEM) device 102 that can be used to manage and/or control the energy consumption of a home. For example, HEM device 102 can control (e.g., adjust) the operation of the furnace and/or air conditioner of the home. HEM device 102 can be, for example, a thermostat (e.g., a home thermostat).

As shown in FIG. 1, HEM device 102 includes a multi-node communication hub 104. For example, multi-node communication hub 104 can be embedded in the back plate of HEM device 102 or in a controller (e.g., a charging station for the controller) of HEM device 102.

Although multi-node communication hub 104 is included in HEM device 102 in the embodiment illustrated in FIG. 1, however, embodiments of the present disclosure are not so limited. For example, in some embodiments, multi-node communication hub 104 can be separate from HEM device 102. For instance, multi-node communication hub 104 can be part of an interface module associated with the air conditioner or furnace of the home, attached to (e.g., plugged into) a router (e.g., a broadband router) in the home, or embedded in a security panel of the home.

Multi-node communication hub 104 can control operation of (e.g., communicate with and/or access the control systems of) a number of energy loads (e.g., energy consuming devices, systems, and/or mechanisms) 106-1, 106-2, . . . , 106-N associated with a home in addition to (e.g., besides) the furnace and air conditioner of the home. For example, multi-node communication hub 104 can control (e.g., adjust) the operation of the additional energy loads 106-1, 106-2, . . . 106-N by communicating with the additional energy loads over a number of different communication (e.g., network communication) protocols 107-1, 107-2, . . . , 107-N associated with the additional energy loads. For instance, in the embodiment illustrated in FIG. 1, each additional energy load 106-1, 106-2, . . . , 106-N may be associated with a different (e.g., different type of) communication protocol 107-1, 107-2, . . . ,107-N. However, in some embodiments, a number of the additional energy loads may be associated with the same (e.g., same type of) communication protocol. Multi-node communication hub 104 can communicate with each additional energy load over the particular communication protocol associated with that energy load.

Additional energy loads 106-1, 106-2, . . . ,106-N can be, for example, appliances of the home. For instance, additional energy loads 106-1, 106-2, . . . , 106-N can include a water heater, refrigerator, pool pump, washing machine, dryer, and/or television, among other types of household appliances. However, embodiments of the present disclosure are not limited to a particular type(s) of energy load.

Communication protocols 107-1, 107-2, . . . , 107-N can be a wired or wireless communication protocol such as, for example, Redlink, WiFi, ZigBee, IEEE 802.15.4, IEEE 802.3, IEEE 802.11, Smart Energy Profile (SEP) 2.0, HomePlug, and/or power line carrier (PLC), among other types of communication protocols. However, embodiments of the present disclosure are not limited to a particular type(s) of communication protocol.

Communication protocols 107-1, 107-2, . . . , 107-N can include a number of link layers (e.g., types of physical interfaces) and a number of application layers (e.g., ways of encoding data and commands). For example, each communication protocol 107-1, 107-2, . . . , 107-N can include a different link layer and/or a different application layer.

Multi-node communication hub 104 can translate between communication protocols 107-1, 107-2, . . 107-N (e.g., between the different application layers of the communication protocols). For example, multi-node communication hub 104 can translate between communication protocols 107-1, 107-2, . . . , 107-N by translating the different communication protocols into an XML based common semantic language.

As shown in FIG. 1, multi-node communication hub 104 can control operation of a number of energy storage devices 108-1, 108-2, . . . , 108-M associated with the home and/or a number of distributed energy resources 110-1, 110-2, . . . , 110-P associated with the home. For example, multi-node communication hub 104 can control the operation of the energy storage devices 108-1, 108-2, . . . , 108-M by communicating with the energy storage devices over a number of different communication protocols 109-1, 109-2, . . . , 109-M associated with the energy storage devices, and multi-node communication hub 104 can control the operation of the distributed energy resources 110-1, 110-2, . . . , 110-P by communicating with the distributed energy resources over a number of different communication protocols 111-1, 111-2, . . . , 111-P associated with the distributed energy resources. For instance, in the embodiment illustrated in FIG. 1, each energy storage device 108-1, 108-2, . . . , 108-M may be associated with a different communication protocol 109-1, 109-2, . . . , 109-M and each distributed energy resource 110-1, 110-2, . . . , 110-P may be associated with a different communication protocol 111-1, 111-2, . . . , 111-P. However, in some embodiments, a number of the energy storage devices and/or the distributed energy resources can be associated with the same communication protocol. Multi-node communication hub 104 can communicate with each energy storage device and each distributed energy resource over the particular communication protocol associated with that energy storage device and that distributed energy resource.

Energy storage devices 108-1, 108-2, . . . , 108-M can be any type of device that can store energy (e.g., energy supplied to the home) for use at a later time. For example, an energy storage device could be a plug-in electric vehicle that can be charged using energy from the home. However, embodiments of the present disclosure are not limited to a particular type(s) of energy storage device.

Distributed energy resources 110-1, 110-2, . . . , 110-P can be any type of mechanism that can generate energy for use in the home. For example, a distributed energy resource could be a solar, wind, or geothermal energy generator. However, embodiments of the present disclosure are not limited to a particular type(s) of distributed energy resource.

Communication protocols 109-1, 109-2, . . ., 109-M and 111-1, 111-2, . . . , 111-P can be analogous to communication protocols 107-1, 107-2, . . . , 107-M. For example, communication protocols 109-1, 109-2, . . . , 109-M and 111-1, 111-2, . . . , 111-P can include a number of link and application layers, and multi-node communication hub 104 can translate between communication protocols 109-1, 109-2, . . . , 109-M and 111-1, 111-2, . . . , 111-P. Further, communication protocols 109-1, 109-2, . 109-M and/or 111-1, 111-2, . . . , 111-P can be the same type and/or a different type(s) of communication protocols as communication protocols 107-1, 107-2, . . . , 107-M.

As shown in FIG. 1, multi-node communication hub 104 can communicate with a utility meter 112 associated with the home over a communication protocol 113 associated with utility meter 112. For example, multi-node communication hub 104 can receive energy consumption information (e.g., data) associated with the home (e.g., the amount of energy being consumed by the home) from utility meter 112, and HEM device 102 can display the received energy consumption information (e.g., to a user of HEM device 102). That is, utility meter 112 can determine (e.g., measure) the amount of energy being provided (e.g., supplied) to the home by an energy service provider (e.g., energy service provider 120), and send this information to multi-node communication hub 104 over communication protocol 113.

Communication protocol 113 can be analogous to the communication protocols previously described herein (e.g., 107-1, 107-2, . . . , 107-N, 109-1, 109-2, . . . , 109-M, 111-1, 111-2, . . . , 111-P). For example, communication protocol 113 can include a link layer and an application layer. Further, communication protocol 113 can be the same type or a different type of communication protocol as the communication protocols previously described herein.

Further, utility meter 112 can communicate with the energy service provider (e.g., energy service provider 120) that provides (e.g., supplies) energy to the home, as shown in FIG. 1. For example, utility meter 112 can receive information (e.g., data) from energy service provider 120 associated with the energy that energy service provider 120 is providing to the home, such as, for instance, the price of the energy being provided to the home. Utility meter 112 can then send the information received from energy service provider 120 to mutli-node communication hub 104 over communication protocol 113. That is, multi-node communication hub 104 can communicate with (e.g., receive information from) energy service provider 120 through (e.g., via) utility meter 112.

As an additional example, energy service provider 120 can communicate with multi-node communication hub 104 through web portal 116 and firewall 118, as illustrated in FIG. 1. For example, energy service provider 120 can send information (e.g., data associated with the energy that energy service provider 120 is providing to the home) to multi-node communication hub 104 through web portal 116 and firewall 118. That is, multi-node communication hub 104 can receive information from energy service provider 120 through web portal 116 and firewall 118.

Web portal 116 can be a network, such as, for instance, the internet, that is hosted external to (e.g., outside of) the home. Firewall 118 can be any type of device, system, or mechanism that can prevent unauthorized access to and/or communication with HEM 102 from outside the home.

As shown in FIG. 1, multi-node communication hub 104 can communicate with a web enabled device 114. For example, web enabled device 114 can directly access (e.g., without going through web portal 116 or firewall 118) multi-node communication hub 104 from within the home (e.g., from within firewall 118). However, web enabled device 114 may not directly access mutli-node communication hub 104 from outside the home (e.g., from outside firewall 118). Rather, web enabled device 114 can access multi-node communication hub 104 from outside the home through web portal 116 and firewall 118.

Web enabled device 114 can be, for example, a computing device capable of accessing and/or communicating over web portal 116 (e.g., a network such the internet). For instance, web enabled device 114 can be a laptop computer, a desktop computer, or a mobile device (e.g., a smart phone, a tablet, a mobile phone, a personal digital assistant, etc.), among other types of computing device. However, embodiments of the present disclosure are not limited to a particular type of web enabled device(s).

Multi-node communication hub 104 can communicate through web portal 116. For example, multi-node communication hub 104 can communicate with energy service provider 120 and/or web enabled device 114 outside the home through web portal 116, as previously described herein. The communication can include, for instance, sending information (e.g., data) from multi-node communication hub 104 through web portal 116 (e.g., to energy service provider 120 and/or web enabled device 114 outside the home), and/or periodically retrieving, by multi-node communication hub 104, information (e.g., data and/or control instructions) through web portal 116 (e.g., from energy service provider 120 and/or web enabled device 114 outside the home). However, the communication may not include accessing, through web portal 116 (e.g., by energy service provider 120 and/or web enabled device 114 outside the home), multi-node communication hub 104 to program (e.g., write) information to HEM device 102. That is, HEM device 102 can prevent information from being programmed thereto from outside the home.

Figure 2:
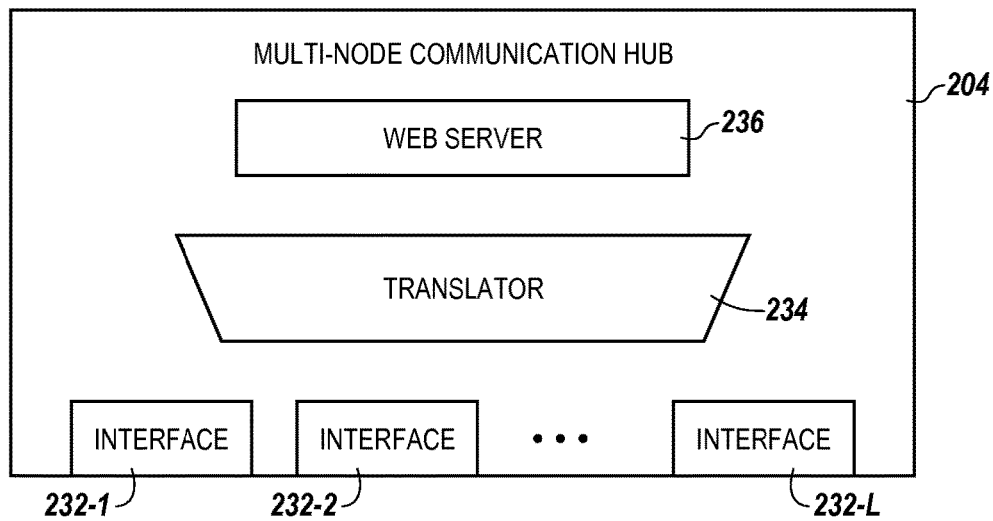
FIG. 2 illustrates a multi-node communication hub in accordance with one or more embodiments of the present disclosure.

FIG. 2 illustrates a multi-node communication hub 204 in accordance with one or more embodiments of the present disclosure. Multi-node communication hub 204 can be, for example, multi-node communication hub 104 previously described in connection with FIG. 1.

As shown in FIG. 2, multi-node communication hub 204 includes a number of interfaces 232-1, 232-2, ..., 232-L. Each interface 232-1, 232-2, ..., 232-L can be associated with a different communication (e.g., network communication) protocol (e.g., interface 232-1 can be associated with a first communication protocol, interface 232-2 can be associated with a second communication protocol, etc.). As an example, interface 232-1 can be associated with communication protocol(s) 107-1, 109-1, and/or 111-1 previously described in connection with FIG. 1, interface 232-2 can be associated with communication protocol(s) 107-2, 109-2, and/or 111-2 previously described in connection with FIG. 1, and interface 232-L can be associated with communication protocol(s) 107-N, 109-M, and 111-P previously described in connection with FIG. 1.

Each interface 232-1, 232-2, ..., 232-L can communicate over the communication protocol associated with that interface (e.g., interface 232-1 can communicate over the first communication protocol, interface 232-2 can communicate over the second communication protocol, etc.). As an example, interface 232-1 can communicate with energy load 106-1, energy storage device 108-1, and/or distributed energy resource 110-1 over communication protocol(s) 107-1, 109-1, and/or 111-1, respectively, previously described in connection with FIG. 1, interface 232-2 can communicate with energy load 106-2, energy storage device 108-2, and/or distributed energy resource 110-2 over communication protocol(s) 107-2, 109-2, and/or 111-2, respectively, previously described in connection with FIG. 1, and interface 232-L can communicate with energy load 106-N, energy storage device 108-M, and/or distributed energy resource 110-P over communication protocol(s) 107-N, 109-M, and/or 111-P, respectively, previously described in connection with FIG. 1.

As shown in FIG. 2, multi-node communication hub includes a translator 234. Translator 234 can translate between the different communication protocols (e.g., between the different application layers of the different communication protocols) associated with interfaces 232-1, 232-2, ..., 232-L. For example, translator 234 can translate the different communication protocols into an XML based common semantic language.

As shown in FIG. 2, multi-node communication hub includes a web server 236. Web server 236 can permit a web enabled device (e.g., web enabled device 114 previously described in connection with FIG. 1) to access (e.g., directly access) multi-node communication hub 204 from within the home.

Figure 3:
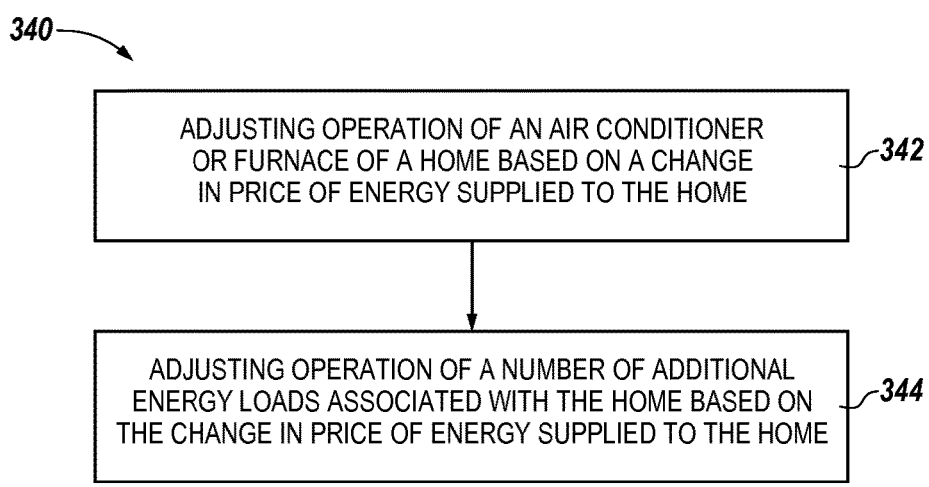
FIG. 3 illustrates a method of operating a home energy management device in accordance with one or more embodiments of the present disclosure.

FIG. 3 illustrates a method 340 of operating a home energy management (HEM) device in accordance with one or more embodiments of the present disclosure. The HEM device can be, for example, HEM device 102 previously described in connection with FIG. 1. That is, method 340 can be performed by (e.g., using) HEM device 102.

At block 342, method 340 includes adjusting operation (e.g., energy consumption) of an air conditioner or furnace of a home based on (e.g., in response to) a change in price of energy supplied to the home. At block 344, method 340 includes adjusting operation (e.g., energy consumption) of a number of additional energy loads (e.g., energy consuming devices, systems, and/or mechanisms) associated with the home based on the change in price of energy supplied to the home. As an example, the energy consumption of the air conditioner, furnace, and/or additional energy loads can be decreased in response to an increase in the price of energy supplied to the home.

The additional energy loads can be, for example, energy loads 106-1, 106-2, ..., 106-N previously described in connection with FIG. 1. Adjusting the operation of the additional energy loads can include, for example, communicating with, by the HEM device, a first of the additional energy loads (e.g., energy load 106-1) over a first communication protocol (e.g., communication protocol 107-1 previously described in connection with FIG. 1) associated with the first additional energy load, a second of the additional energy loads (e.g., energy load 106-2) over a second (e.g., different) communication protocol (e.g., communication protocol 107-2 previously described in connection with FIG. 1) associated with the second additional energy load, etc.

In some embodiments, the HEM device can receive a notification of the change in the price of energy and/or a load curtailment supplied to the home from an energy service provider (e.g., energy service provider 120 previously described in connection with FIG. 1). For example, the HEM device can receive the notification of the price change and/or load curtailment from the energy service provider through (e.g., via) a utility meter of the home (e.g., utility meter 112 previously described in connection with FIG. 1) and/or a web portal (e.g., web portal 116 previously described in connection with FIG. 1).

In some embodiments, the HEM device can monitor the energy consumption of the additional energy loads, and adjust the operation of the additional energy loads based on the energy consumption of the additional energy loads. For example, the HEM device can detect and/or alert a user of the HEM device of wasteful energy consumption by one or more of the additional energy loads, and reduce the energy consumption of the additional energy loads accordingly.

In some embodiments, the HEM device can receive a weather forecast, and adjust the operation of the additional energy loads based on the weather forecast. The weather forecast can be received, for example, from a weather forecasting service through the web portal.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A home energy management device, comprising:
   a thermostat, wherein:
   the thermostat is configured to control operation of an air conditioner and a furnace of a home; and
   the thermostat includes a multi-node communication hub embedded in a back plate of the thermostat and configured to:
   control operation of a number of additional energy loads associated with the home by communicating with the number of additional energy loads over a number of different communication protocols, wherein each respective communication protocol includes a different link layer and a different application layer, wherein controlling the operation of the number of additional energy loads includes:
   monitoring energy consumption of the number of additional energy loads; and
   automatically adjusting the operation of the number of additional energy loads based on the energy consumption of the number of additional energy loads, wherein automatically adjusting the operation of the number of additional energy loads includes communicating with a first of the additional energy loads over a first wireless communication protocol and communicating with a second of the additional energy loads over a second wireless communication protocol that is different than the first wireless communication protocol;
   control operation of a number of energy storage devices associated with the home, wherein controlling the operation of the number of energy storage devices includes communicating with a first of the energy storage devices over a first wireless communication protocol and communicating with a second of the energy storage devices over a second wireless communication protocol that is different than the first wireless communication protocol over which the first of the energy storage devices is communicated with;
   communicate with a utility meter associated with the home to receive, from an energy service provider through the utility meter, a notification of a change in price of energy provided to the home by the energy service provider; and
   adjust the operation of the air conditioner and the furnace of the home based on the change in price of the energy provided to the home; and
   wherein the multi-node communication hub includes a web server configured to:
   permit a web enabled device to directly access the multi-node communication hub from within the home; and
   permit the web enabled device to access the multi-node communication hub from outside the home through a web portal hosted external to the home.

2. The home energy management device of claim 1, wherein the multi-node communication hub is configured to translate between the different application layers.

3. The home energy management device of claim 1, wherein the number of additional energy loads include a number of appliances of the home.

4. The home energy management device of claim 1, wherein the multi-node communication hub is configured to control operation of a number of distributed energy resources associated with the home.

5. A home energy management system, comprising:
   a thermostat configured to control operation of an air conditioner and a furnace of a home, wherein the furnace includes an interface module; and
   a multi-node communication hub, wherein the multi-node communication hub is separate from the thermostat and is part of the interface module of the furnace, and is configured to:
   control operation of a number of additional energy loads associated with the home by communicating with the number of additional energy loads over a number of different communication protocols, wherein each respective communication protocol includes a different link layer and a different application layer, wherein controlling the operation of the number of additional energy loads includes:
monitoring energy consumption of the number of additional energy loads; and
automatically adjusting the operation of the number of additional energy loads based on the energy consumption of the number of additional energy loads, wherein automatically adjusting the operation of the number of additional energy loads includes communicating with a first of the additional energy loads over a first wireless communication protocol and communicating with a second of the additional energy loads over a second wireless communication protocol that is different than the first wireless communication protocol;

control operation of a number of distributed energy resources associated with the home, wherein controlling the operation of the number of distributed energy resources includes communicating with a first of the distributed energy resources over a first wireless communication protocol and communicating with a second of the distributed energy resources over a second wireless communication protocol that is different than the first wireless communication protocol over which the first of the distributed energy resources is communicated with;

communicate with a utility meter associated with the home to receive, from an energy service provider through the utility meter, a notification of a change in price of energy provided to the home by the energy service provider; and adjust the operation of the number of additional energy loads associated with the home based on the change in price of the energy provided to the home; and wherein the multi-node communication hub includes a web server configured to:
permit a web enabled device to directly access the multi-node communication hub from within the home; and
permit the web enabled device to access the multi-node communication hub from outside the home through a web portal hosted external to the home.

6. The home energy management system of claim 5, wherein:
the multi-node communication hub includes a number of interfaces; and
each respective interface is associated with a different one of the communication protocols and is configured to communicate over the communication protocol associated with that interface.

7. The home energy management system of claim 5, wherein the multi-node communication hub includes a translator configured to translate between the different communication protocols.

\* \* \* \* \*